United States Patent [19]
Ukigawa et al.

[11] Patent Number: 6,161,108
[45] Date of Patent: Dec. 12, 2000

[54] METHOD AND APPARATUS FOR MANAGING IMAGES, A METHOD AND APPARATUS FOR RETRIEVING IMAGES, AND A COMPUTER-READABLE RECORDING MEDIUM WITH A PROGRAM FOR MAKING A COMPUTER EXECUTE THE METHODS STORED THEREIN

[75] Inventors: Kazunori Ukigawa; Hatsuko Ukigawa, both of Tokushima, Japan

[73] Assignee: Justsystem Corp., Tokushima, Japan

[21] Appl. No.: 09/005,148

[22] Filed: Jan. 9, 1998

[30] Foreign Application Priority Data

Aug. 28, 1997 [JP] Japan ................................. 9-111504

[51] Int. Cl.[7] ................................................ G06F 17/30
[52] U.S. Cl. ............................ 707/104; 707/3; 704/271; 434/176; 382/9
[58] Field of Search ..................................... 707/3–5, 934, 707/102, 104; 706/8; 704/271; 434/176

[56] References Cited

U.S. PATENT DOCUMENTS

| | | | |
|---|---|---|---|
| 5,450,314 | 9/1995 | Kagami et al. | 706/46 |
| 5,493,677 | 2/1996 | Balogh et al. | 707/104 |
| 5,617,119 | 4/1997 | Briggs et al. | 707/100 |
| 5,659,742 | 8/1997 | Beattie et al. | 707/104 |
| 5,684,999 | 11/1997 | Okamoto | 704/9 |
| 5,708,805 | 1/1998 | Okamoto et al. | 707/3 |
| 5,724,484 | 3/1998 | Kagami et al. | 706/50 |

FOREIGN PATENT DOCUMENTS

| | | |
|---|---|---|
| 4-180175 | 6/1992 | Japan . |
| 4-237377 | 8/1992 | Japan . |
| 4-253274 | 9/1992 | Japan . |
| 4-264972 | 9/1992 | Japan . |
| 5-189531 | 7/1993 | Japan . |
| 6-131403 | 5/1994 | Japan . |
| 6-176121 | 6/1994 | Japan . |
| 07200634 | 8/1995 | Japan . |
| 07219969 | 8/1995 | Japan . |
| 07334507 | 12/1995 | Japan . |
| 08016611 | 1/1996 | Japan . |
| 08138075 | 5/1996 | Japan . |
| 9-81590 | 3/1997 | Japan . |

OTHER PUBLICATIONS

I. Keshi, H. Ikeuchi, R. Tanaka and M. Osaki, Sharp Technical Journal, Dec. 1994, "Multimedia Information Retrieval Using Knowledge Encyclopedia Texts" pp. 1–3 and 30–37.

I. Keshi, H. Ikeuchi, and R. Tanaka, The Japan Information Center of Science and Technology, Oct. 1994, "Image Retrieval Using Semantic Vectors" pp. 4–9 and 578–650.

M. Shibata and Y. Kim, NHK Science and Technical Research Laboratories, Aug. 1996, "Video Indexing for the Broadcasting Media", pp. 10–12 and 1–8.

*Primary Examiner*—Hosain T. Alam
*Assistant Examiner*—Jean Bolte Fleurantin
*Attorney, Agent, or Firm*—Sughrue, Mion, Zinn, Macpeak & Seas, PLLC

[57] ABSTRACT

Image data and natural language data indicating a visual impression of an image prepared based on the image data are correlated to each other and stored in the correlated form in the image database, and when retrieving an image using the retrieving section, natural language data indicating a text for retrieval is inputted from a natural language input section, and image data relating to natural language data having a common visual impression is extracted from the image database by collating the inputted natural language data to natural language data on the image database.

15 Claims, 18 Drawing Sheets

FIG.7
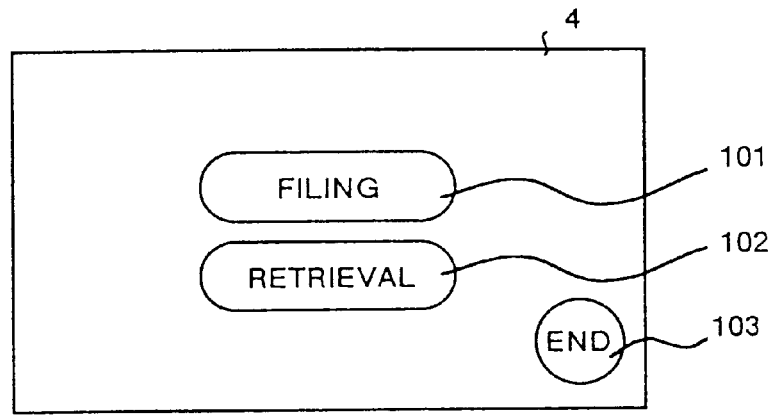
(a)
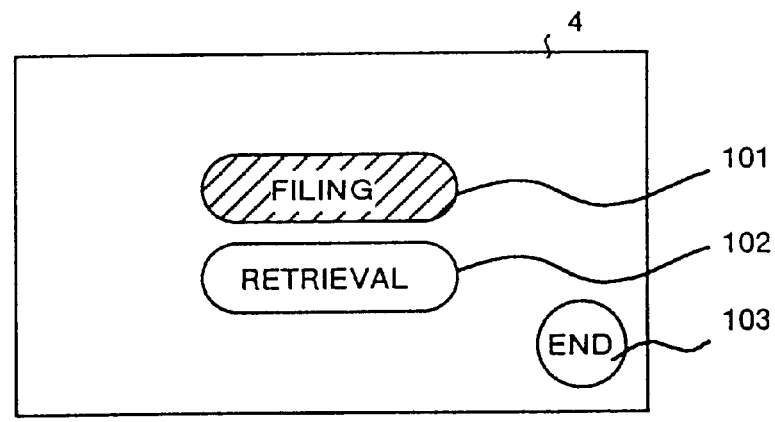
(b)
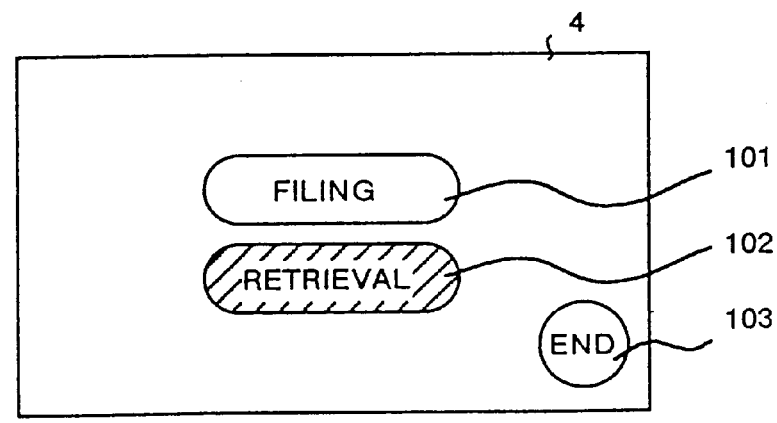
(c)

FIG. 11

FRAME 1

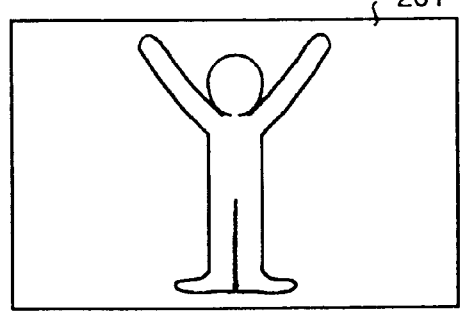

AFTER RAISING BOTH HANDS UPWARDS, ROTATE SHOLDERS.

FRAME m

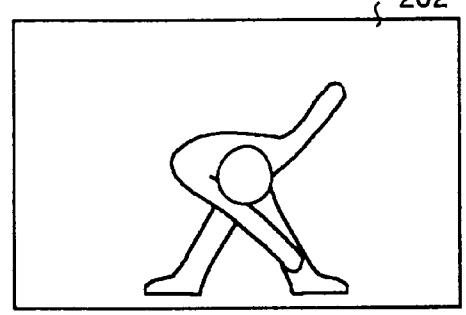

AFTER RISING·········.
NEXT, OPENING BOTH LEGS AND BENDING THE UPPER PART OF THE BODY, ROTATE THE HIP AND TRY TOUCHING THE LEFT ANKLE BY THE RIGHT HAND.

FRAME n

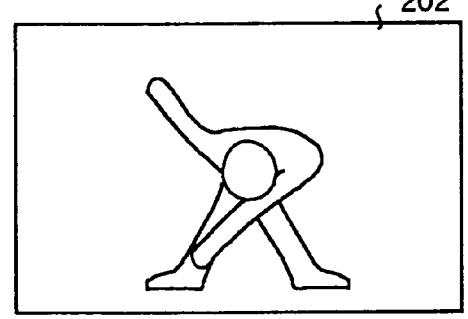

⋮
WHEN TOUCHING THE LEFT ANKLE, THIS TIME, ROTATE THE HIP REVERSELY AND TRY TOUCHING THE RIGHT ANKLE BY THE LEFT HAND.

(IMAGE : MOVING PICTURE)   (NATURAL LANGUAGE)

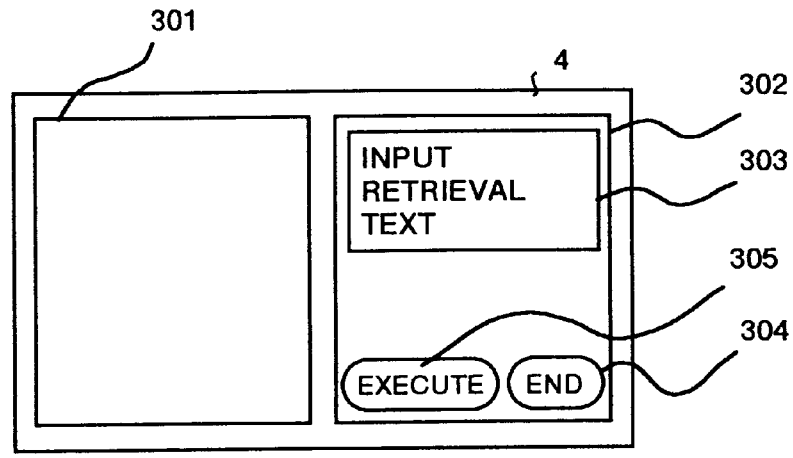
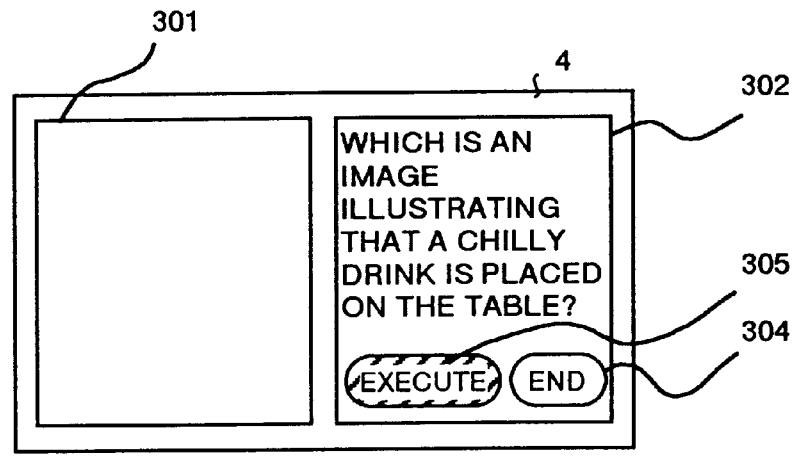
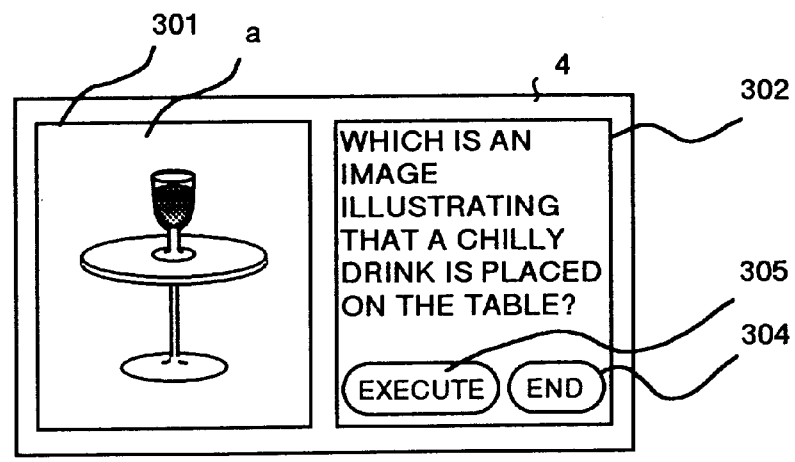

METHOD AND APPARATUS FOR MANAGING IMAGES, A METHOD AND APPARATUS FOR RETRIEVING IMAGES, AND A COMPUTER-READABLE RECORDING MEDIUM WITH A PROGRAM FOR MAKING A COMPUTER EXECUTE THE METHODS STORED THEREIN

FIELD OF THE INVENTION

The present invention relates to a method and apparatus for managing images using a natural language, a method and apparatus for retrieving images using a natural language, as well as to a computer-readable recording medium with a program for making a computer execute the methods stored therein.

BACKGROUND OF THE INVENTION

Conventionally, a technology for retrieving an image using a natural language has been proposed in Japanese Patent Laid-Open Publications No. HEI 4-180175, No. HEI 4-264972, No. HEI 6-176121, No. HEI 7-334507, and No. HEI 8-138075 or the like. In these publications, there is disclosed a technology in which contents of an inputted natural language are interpreted by linguistically analyzing the language such as analysis of morphophonemes there of or the like and an image matching to the contents is retrieved.

Here, an image having attribute information such as outline of the image or the like previously correlated to the image is stored in a storage, and a desired image is obtained by verifying the result of linguistic analysis of the inputted natural language with the attribute information.

As an attribute information correlated with an image to be stored, in general, filing date, name of the operator, type of the image (a photograph, a picture or text or the like) are used.

In the conventional technology as disclosed in the above publications, attribute information is previously correlated to an image as retrieval keys, so that, if any natural language relating to the attribute information is given, a desired image can be retrieved. However, since most of the attribute information is objective and minimal information required for retrieval, a user might forget the information unless he/she makes a note of it. For this reason, in a case where the user forgets the attribute information which is to be given as the retrieval key, or doubts the attribute information which the user has in his/her memory, there is a great possibility that the user may give, to a computer, data comprising a natural language far beyond the attribute information which a desired image is supposed to have, which makes it difficult to find the desired image out of an enormous amount of images.

SUMMARY OF THE INVENTION

It is an object of the present invention, to solve the problems according to the examples based on the conventional technology, to obtain a method and apparatus for managing images which allows easy access to a desired image regardless of the attribute information, and a computer-readable recording medium with a program for making a computer execute the method stored therein.

It is an another object of the present invention, to solve the problems according to the examples based on the conventional technology, to obtain a method and apparatus for retrieving images which can retrieve a desired image more reliably and more efficiently, and a computer-readable recording medium with a program for making a computer execute the method stored therein.

It should be noted that, a similar technology is disclosed in the Japanese Patent Laid-Open Publication No. HEI 6-131403, in which image information and voice information in natural language as items correlated with a word (a heading) is stored in a dictionary. However, the correlation between a natural language and an image -in relation to the retrieval of an image is not technologically disclosed.

With the present invention, image data and natural language data indicating a visual impression of an image prepared based on the image data are correlated to each other and stored in the correlated form, so that image database can be built up with subjective elements visual impression of each image.

With the present invention, image data and natural language data indicating a visual impression of the image prepared based on the image data are correlated to each other and stored in the correlated form in an image database, and when access is executed with a natural language data for the v:Usual impression in the image database, the image data related to the natural language data is returned as a response, so that access with a visual impression, namely a subjective impression which has having nothing to do with attribute information becomes possible, whereby a desired image can easily be accessed.

With the present invention, natural language data to be stored in correlation to image data is inputted through key operation, voice recognition, image recognition or the like, so that it is possible to give visual information with subjectivity to each image without being restricted by the need for objectivity.

With the present invention, image data is a data such as still picture data or moving picture data, so that it is possible to give arbitrary visual information to each image irrespective of the type of the image.

With the present invention, image data and natural language data indicating a visual impression for an image prepared based on the image data are correlated and stored in an image database, and image data relating to natural language data each having a common visual impression is extracted from the image database by inputting natural language data indicating a text for retrieval and collating the data to natural language data on the image database, so that an image can be retrieved only with a visual impression, namely a subjective impression, without the any need for knowing attribute information for the image; whereby a desired image can more accurately and more efficiently be retrieved.

With the present invention, when retrieving an image, the natural language data stored in the image database and inputted natural language data is collated after linguistic analysis of the data, so that, collation suited to the meaning of a visual impression can be executed with a high-precision.

With the present invention, when retrieving an image, a plurality of data having a higher similarity in an ascending order are extracted according to a result of collation, so that a plurality of images having similar visual impressions are listed as candidates; whereby a desired image can more efficiently be retrieved even according to a visual impression.

With the present invention, image data and natural language data indicating a plurality of visual impressions for an image prepared based on the image data are correlated and stored in an image database, and in a case where a new visual impression corresponding to a visual impression of natural language data as a text for retrieval can be obtained from the plurality of visual impressions for the natural language data on the image database by referring to a knowledge database, image data relating to the natural language data is extracted from the image database, so that, in a step of retrieving, even natural language data, which may be overlooked if only the visual information on the image database is used independently, can be secured as candidates for images to be extracted; whereby a desired image can be retrieved more accurately and efficiently.

With the present invention, when inferring image, the natural language data stored in the image database and the inputted natural language data is inferred after linguistic analysis, so that high-precision inference suited to the meaning of a visual impression is possible.

With the present invention, image display is performed based on the image data extracted through retrieval, so that a result of retrieval is visually provided; whereby it is possible to easily check whether the result of retrieval is correct or erroneous.

With the present invention, there is provided a step of correlating image data and natural language data indicating a visual impression of an image prepared based on the image data to each other and store the data in a correlated form, so that it is possible to build up an image database with subjective elements of visual impressions of images.

With the present invention, there is provided a step of inputting natural language data indicating a text for retrieval, a step of collating inputted natural language data to natural language data stored in the image database in which image data and natural language data indicating a visual impression of an image prepared based on the image data are correlated and stored in the correlated form, and extracting image data related to the natural language data having a common visual impression from the image database according to a result of collation, so that an image can be retrieved only using a visual impression, namely a subjective impression, without any need for knowing attribute information of the image; whereby a desired image can more accurately and efficiently be retrieved.

Other objects and features of this invention will become clear from the following description with reference to the accompanying drawings.

BRIEF DESCRIPTION OF THE DRAWINGS

FIGS. 7A to 7C are views showing examples of the display transitions when the main operations in Embodiment 1 are executed;

FIG. 11 is a view showing example of the display transitions when the filing operations in Embodiment 1 are executed for a moving pictures;

FIGS. 13A to 13C are views showing example of the display transitions when the retrieving operations in Embodiment 1 are executed;

DESCRIPTION OF THE PREFERRED EMBODIMENTS

Detailed description is made hereinafter for preferred embodiments of the method and apparatus for managing images, the method and apparatus for retrieving images, and the computer-readable recording medium with a program for making a computer execute the methods stored therein each according to the present invention with reference to the related drawings.

Embodiment 1

Figure 1:
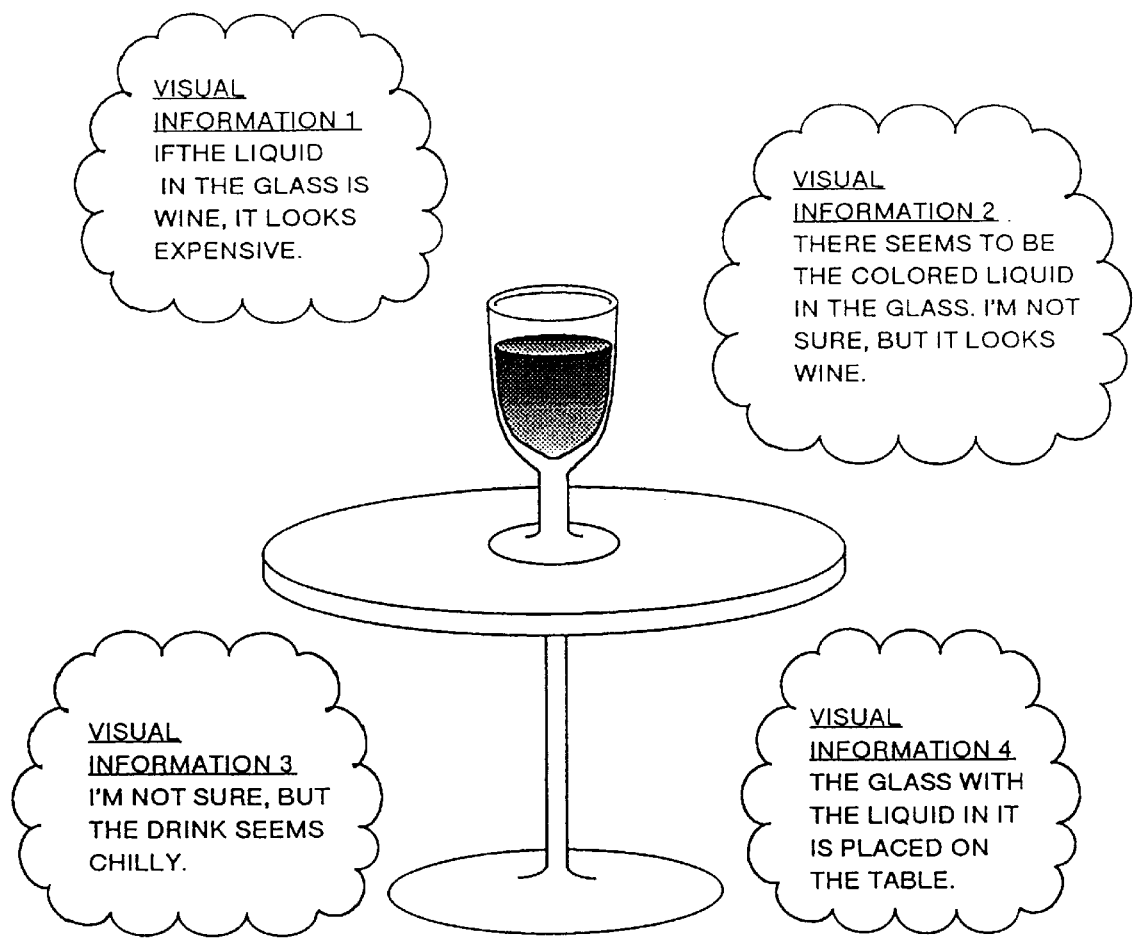
FIG. 1 is a view for explanation of principles according to Embodiment 1 of the present invention.
Figure 2:
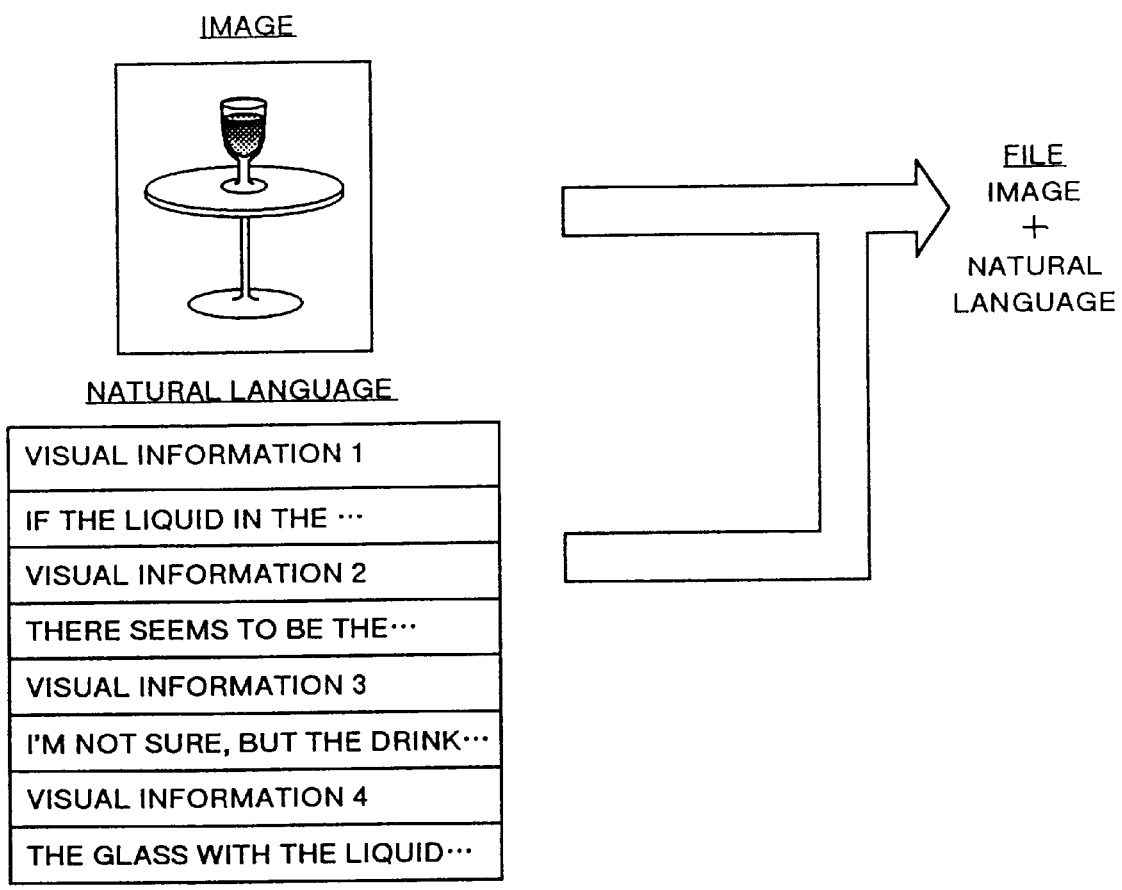
FIG. 2 is a view for explanation of principles according to Embodiment 1 of the present invention.
Figure 3:
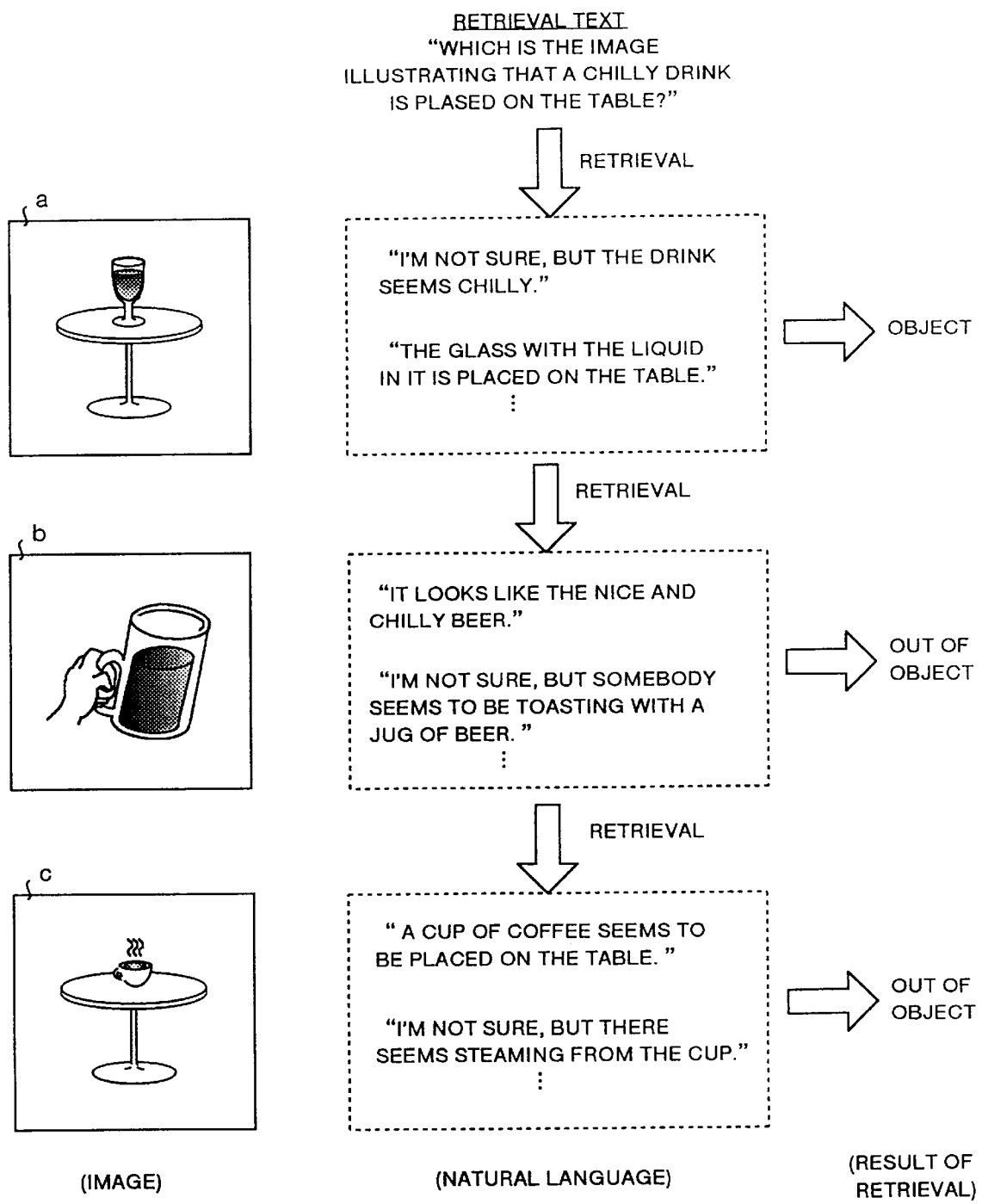
FIG. 3 is a view for explanation of principles according to Embodiment 1 of the present invention.

At first, principles of the inventions are described. FIG. 1 to FIG. 3 are views each for explaining the principles according to Embodiment 1 of the present invention. FIG. 1 shows an image in which a glass with the colored (assuming the color to be red) liquid in it is placed on a round table which has one leg. If a person has any subjective impressions on the image, the following impressions must be included therein. Namely, "If the liquid in the glass is wine, it looks expensive" (this is set as visual information 1), "There seems to be the colored liquid in the glass. I'm not sure, but it looks like wine" (this is set as visual information 2), "I'm not sure, but the drink seems chilly" (this is set as visual information 3), "The glass with the liquid in it is placed on the table" (this is set as visual information 4).

The visual information 1 and 2 indicate, although there is no particular information for specifying that the liquid in the glass is wine in the image shown in FIG. 1, impressions such that the color of the liquid is red and that the form of the glass is similar to that of a wine glass can be obtained. The above visual information 3 indicates an impression a user has obtained by imaging a chilly drink such as wine or tomato juice rather than a hot drink, because, a color of the drink in the glass is red and it is hard to image a red colored hot drink.

When the four types of visual information 1 to 4 are compared to each other, it is found that each of the visual information 1 to 3 expresses a visual impression including conjecture on the image that a user has as characteristics of the image, which corresponds to a subjective impression, while the visual information 4 rather expresses the composition of the image, which is closer to an objective impression although some of the expression therein is subjective.

Not included in the visual information 1 to 3 are impressions for a positional relation between the components in the image such that the glass is placed on the table, or for forms of the components such that the table is a round one or the like, however, if the user tries to tell some of the characteristics later on without looking at the image shown in FIG. 1, expressions like the visual information 1 to 3 are supposed to be used because people, in general, tends to remember an image with fragmentary impressions.

In the present invention, information for correlation between visual information and image data is defined as a file based on the fact that subjective impressions on the image like the visual information 1 to 4 remain in the memory for a long time. Namely, if the image in FIG. 1 is taken up as an example, a file of the image is obtained, as shown in FIG. 2, by correlating with the image the visual information 1 to 4 expressed in a natural language with the image. Accordingly, in a case where the image shown in FIG. 1 is to be retrieved from a plurality of images, a retrieval text expressed in a natural language similar to the visual information 1 to 4 may be given, then, a desired image (FIG. 1) can be specified from a plurality images according to the retrieval text.

It is assumed that there are images a (same as the image in FIG. 1), b, and c, as shown in FIG. 3, for retrieval. The visual information 1 to 4 are correlated with the image a, visual information such as "It looks like the nice and chilly beer." or "I'm not sure, but somebody seems to be toasting with a jug of beer." is correlated with the image b, and visual information such as "a cup of coffee seems to be placed on the table." or "I'm not sure, but there seems steaming from the cup." or the like is correlated with the image c.

In a case where a retrieval text such as "which is the image illustrating that a chilly drink is placed on the table?" is given to retrieve a desired image a from the plurality of images a, b or c, as shown in FIG. 3, the retrieval text is verified against each of the visual information (in natural language) correlated to each of the images a, b and c. With this verification, an image having visual information with the highest degree of similarity is extracted as an object for retrieval.

The basis for verification in the retrieval text are the impressions indicating a positional relation between the table and the drink as well as the impression that the drink seems to be chilly. In case of image a, the impression of "the drink is chilly" according to the visual information 3 corresponds to the point of the retrieval text, and the impression of "a glass with the liquid in it is placed on the table" according to the visual information 4 corresponds thereto.

Namely, the image a matches the image in which a chilly drink is placed on the table. In case of image b, only the impression of a chilly drink (beer) corresponds to the point of the retrieval text, and in case of image c, only the impression of a positional relation that a cup is placed on the table corresponds to the point thereof.

Accordingly, in the example shown in FIG. 3, the image a having the visual information with the highest degree of similarity to the points thereof is extracted, and the other images b and c are out of the object for retrieval.

Figures 4, 5:
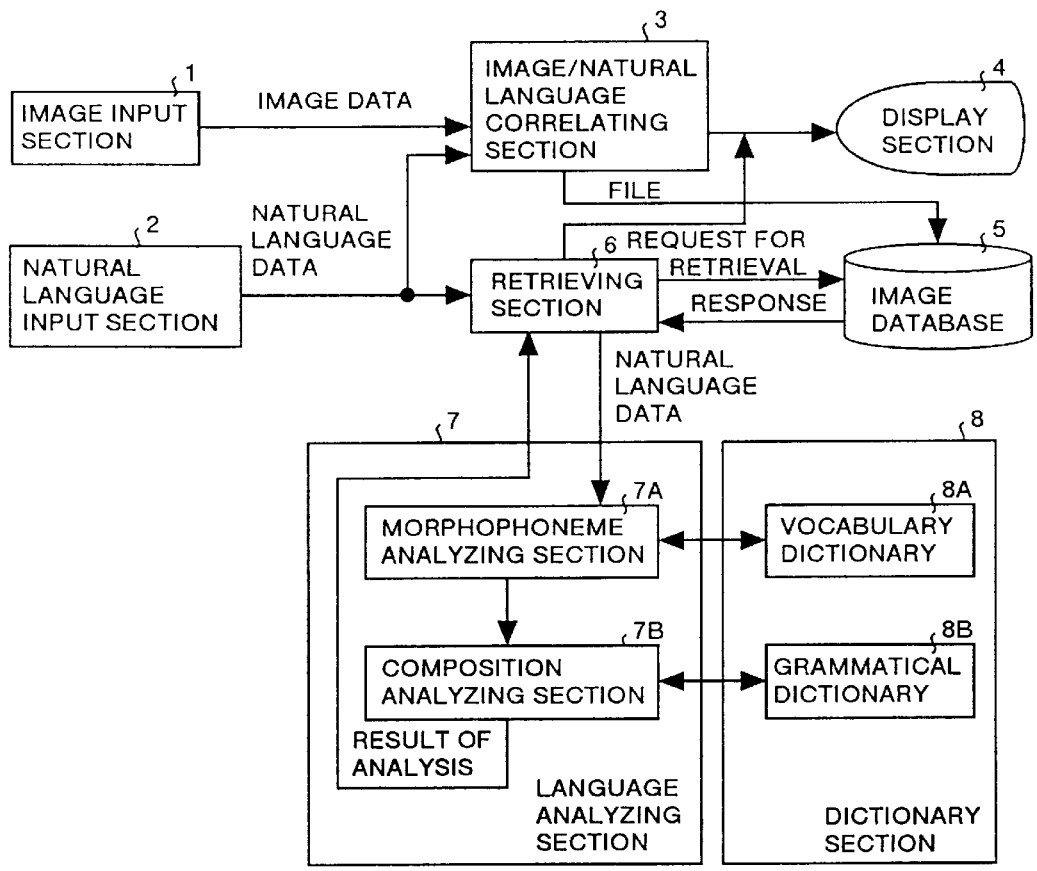
FIG. 4 is a block diagram showing functionally an apparatus for processing images according to Embodiment 1 of the present invention.
FIG. 5 is a view for explaining schematically the contents stored in an image database according to Embodiment 1.

In the next, description is made for a concrete apparatus. FIG. 4 is a block diagram showing functionally an apparatus for processing images according to Embodiment 1 of the present invention. The apparatus for processing images shown in FIG. 4 performs the functions of both, the apparatus for managing images as well as the apparatus for retrieving images according to the present invention.

The apparatus for processing images shown in FIG. 4 comprises, for instance, an image input section 1, a natural language input section 2, an image/natural language correlating section 3, a display section 4, an image database 5, a retrieving section 6, a language analyzing section 7, and a dictionary section 8. The image input section 1 inputs image data to be stored in the image database 5, and the natural language input section 2 inputs visual information added to the image data to be stored in the image database 5 by correlating therewith and a retrieval text for retrieval each as data expressed by a natural language.

The image/natural language correlating section 3 correlates between the image data inputted by the image input section 1 to the data for a natural language inputted by the natural language input section 2, and outputs the correlated data to the image database 5 as a file. The image/natural language correlating section 3 outputs, because correlation between an image and visual information is carried out by displaying both of them, display data based on the image data as well as on the natural language data to the display section 4.

The display section 4 receives, when correlation is to be carried out, display data from the image/natural language correlating section 3 to display an image and visual information, and at the same time receives, when retrieval is to be executed, display data from the retrieving section 6 to display a retrieval text and a result of the retrieval (an image). The image database 5 stores therein a file correlating the image data and the natural language data correlated with each other by the image/natural language correlating section 3, and returns (response) natural language data and image data to the retrieving section 6 according to a request for retrieval therefrom.

The retrieving section 6 makes the language analyzing section 7 subject an input retrieval text and visual information on the image database 5 to language analysis according to the retrieval text (natural language data) inputted by the natural language input section 2 to verify them against each other. This retrieving section 6 extracts image data correlated with the visual information in the high degree of similarity to the inputted retrieval text from the image database according to a result of the verification, and makes the display section 4 display the result of the retrieval (the extracted image) thereon.

Applicable to a natural language processing section comprising the language analyzing section 7 and the dictionary section 8 is a known natural language processing technology disclosed in "Basic technology for natural language processing" (written by Hirosato Nomura) 1988 published by Institute of Electronics, Information and Communication Engineers.

The language analyzing section 6 comprises a morphophoneme analyzing section 7A and a composition analyzing section 7B, and the dictionary section 8 comprises a vocabulary dictionary 8A supporting morphophoneme analysis and a grammatical dictionary 8B supporting composition analysis. The morphophoneme analyzing section 7A analyzes morphophonemes of the inputted natural language data referring to the vocabulary dictionary 8A, and the composition analyzing section 7B analyzes composition on the inputted natural language data referring to the grammatical dictionary 8B. Result of the analysis by the composition analyzing section 7B is outputted to the retrieving section 6.

Then, description is made for the image database 5. FIG. 5 is a view for schematically explaining contents stored in the image database 5 according to Embodiment 1. The image database 5 stores, as shown in FIG. 5, image data and the natural language data correlated with the file name. Herein, a file name is taken as example because, a particular file name is generally specified to a file, however, a file name itself has nothing to do with the object of the present invention.

A file having a file name FILE-A, for instance, is correlated with image data IMG-A as well as with natural language data NLD-A, and a file having a file name FILE-B is correlated with image data IMG-B as well as with natural language data NLD-B. The natural language data included in each of the files has visual information as the contents therein, and for this reason, a plurality of visual information like the natural language data NLD-A can be provided.

The term "a plurality of (visual information)" described above indicates the fact that a plurality of texts expressing visual impression exist therein and does not mean that there are a plurality of discrete visual information. Namely, being interrupted, the context is divided into a plurality of visual information but it is one unit from the view point of natural language data. As described above, visual impressions are allowed to be unlimitedly given to one image from every view points.

Figure 6:
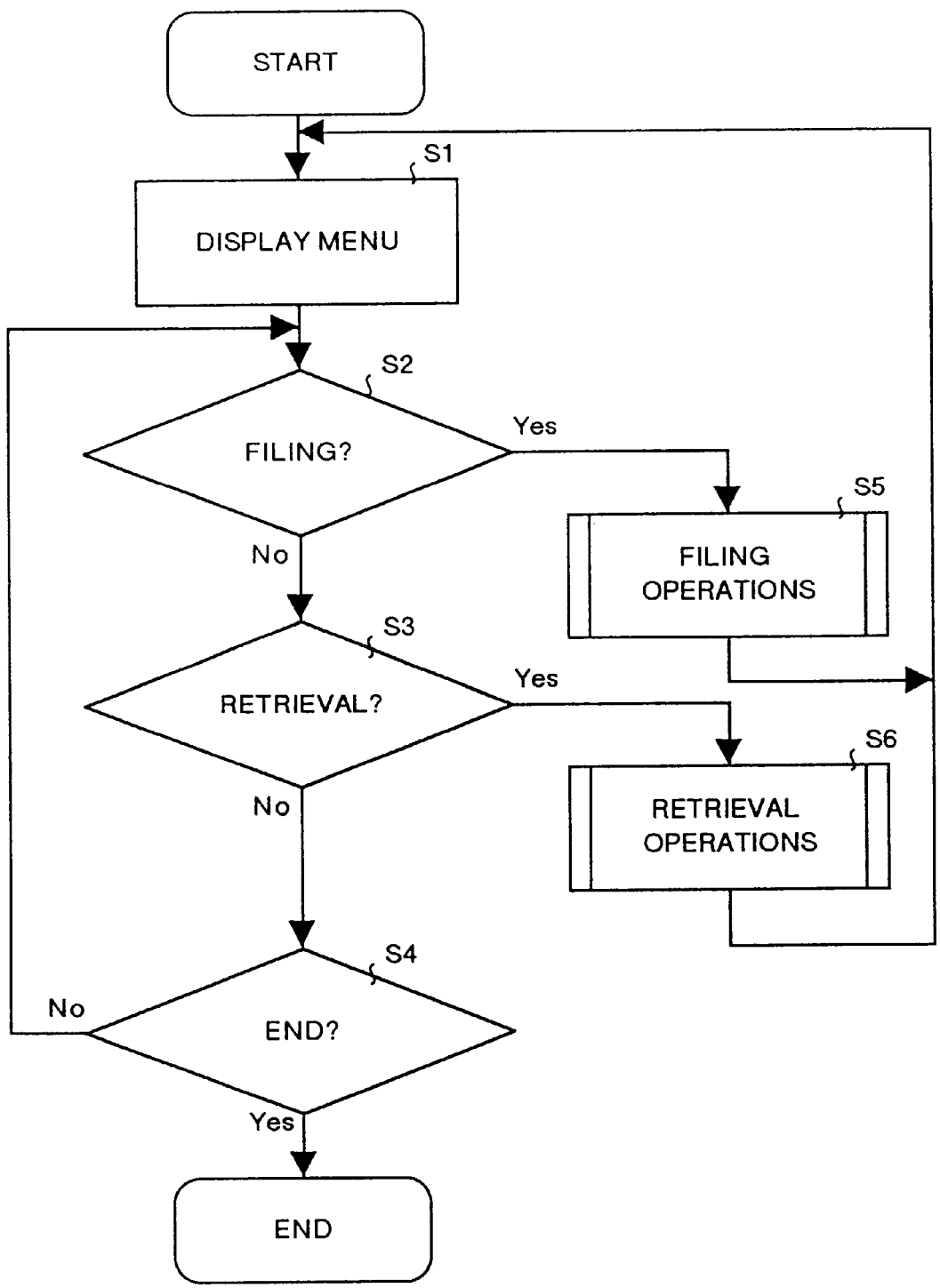
FIG. 6 is a flow chart for explaining the main operations in Embodiment 1.

In the next, description is made for operations. At first, description is made for the main operations. FIG. 6 is a flow chart for explaining the main operation in Embodiment 1, and FIGS. 7A to 7C are views showing examples of a display transitions when the main operations in Embodiment 1 are executed.

At first, there is displayed on a screen of the display section 4 a menu (refer to FIG. 7A) having a "FILING" icon 101 for operating filing of an image, a "RETRIEVAL" icon 102 for operating retrieval of an image, and an "END" icon 103 for ending the processing thereon as alternatives (step S1). Then, it is sensed which icon is selected among the "FILING" icon 101, "RETRIEVAL" icon 102, and "END" icon 103. This selecting operation is carried out through an operating section which is not shown herein.

Figure 8:
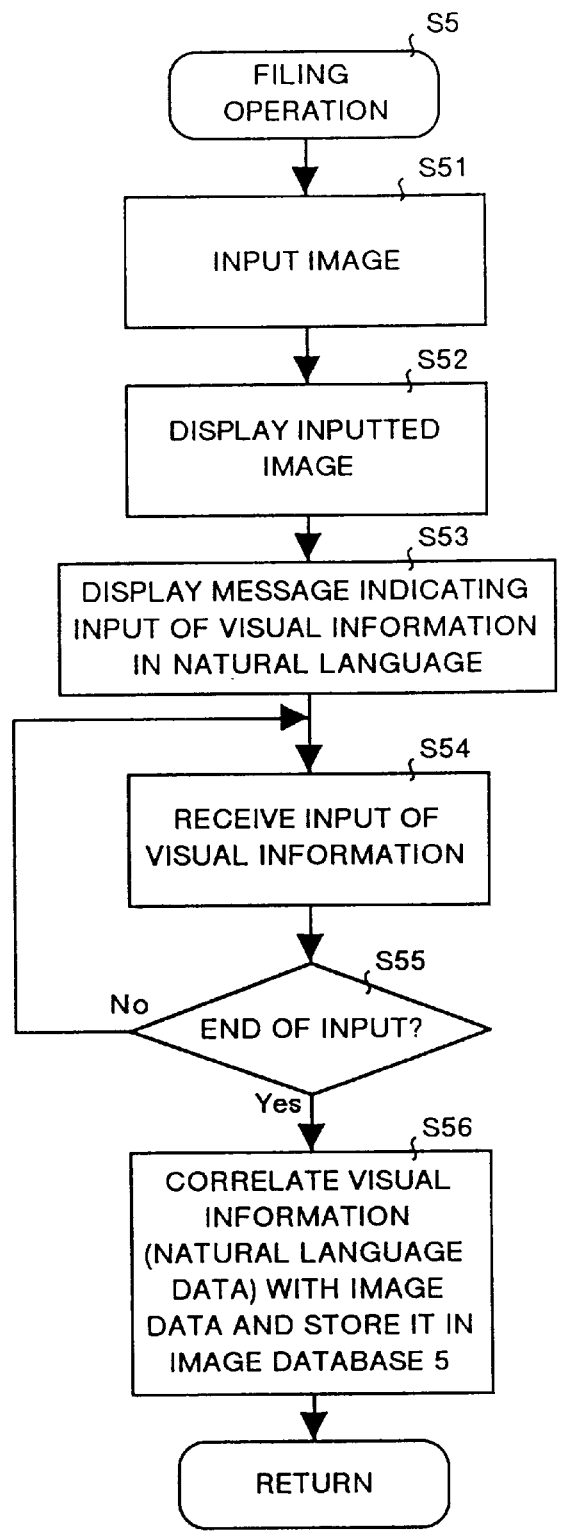
FIG. 8 is a flow chart for explaining the filing operations in Embodiment 1.

Then, as shown in FIG. 7B, if it is sensed that the "FILING" icon 101 (indicated by the shaded area in the figure) has been selected (step S2), the processing shifts to the filing operations shown in FIG. 8 (step S5). After the above processing, the processing returns again to the menu displayed in step S1. Also, as shown in FIG. 7C, if it is sensed that the "RETRIEVAL" icon 102 (indicated by the shaded area in the figure) has been selected (step S3), then the processing shifts to the retrieval operations shown in FIG. 12 (step S6). After the above processing, the processing returns again to the menu displayed in step S1. Then, if it is sensed that the "END" icon 103 has been selected (step S4), then the processing terminates.

In the next, description is made for filing operations of an image. FIG. 8 is a flow chart for explaining filing operations in Embodiment 1, and FIGS. 9A to 9C are views showing examples of the display transitions when the filing operations in Embodiment 1 are executed, FIG. 10 is a view for explaining schematically an example of storage in the image database according to Embodiment 1, and FIG. 11 shows examples of the display transitions when filing operation in Embodiment 1 is executed for a moving pictures.

When the processing shifts to the filing operations, at first, image data is inputted by the image input section 1 (step S51), and an image is displayed on the display section 4 based on the inputted image data (step S52). More specifically, as shown in FIG. 9A, an image display area 201 and a natural language display area 202 are displayed on the screen of the display section 4. The image a (refer to FIG. 3) is displayed in the image display area 201 as in example herein.

Figure 9A:
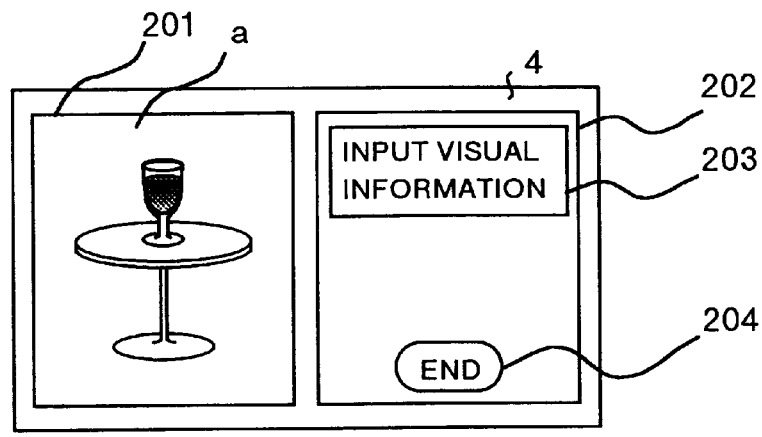
FIGS. 9A to 9C are views showing examples of the display transitions when the filing operations in Embodiment 1 are executed.
Figure 9B:
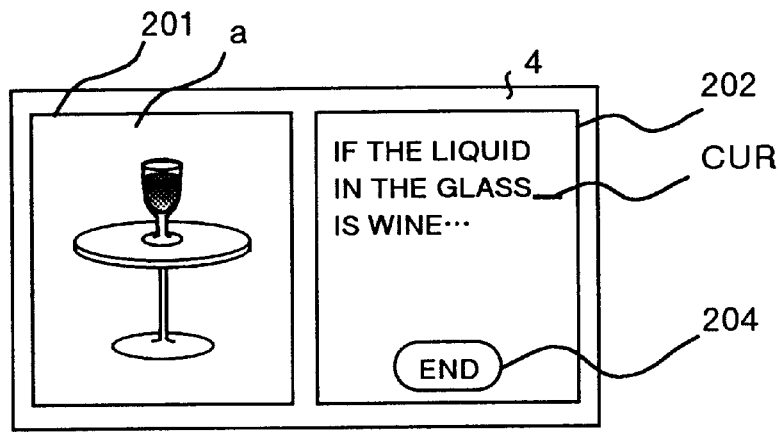
Figure 9C:
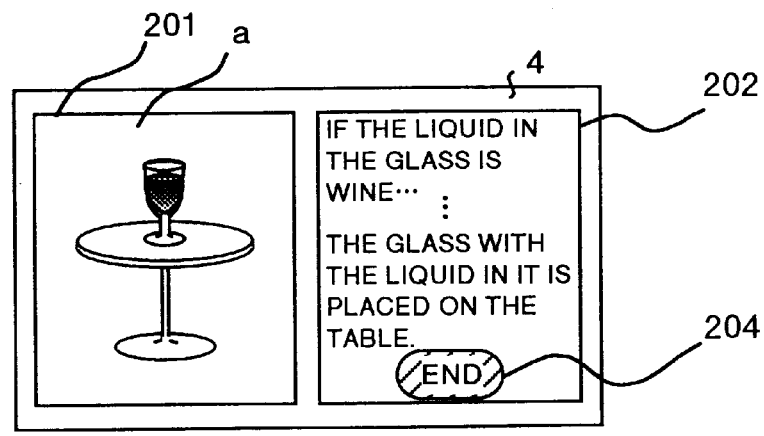
Figure 10:
FIG. 10 is a view for explaining schematically an example of how the image data is stored in the image database according to Embodiment 1.

Further displayed, as shown in FIG. 9A, on the natural language display area 202 is a message ("Input visual information" in the example in the figure) 203 indicating that visual information for the image a displayed on the image display area 201 is to be inputted in a natural language (step S53). It should be noted that an "END" icon 204 is displayed in the natural language display area 202 to end the filing processing.

Then, input of visual information namely natural language data is received (step S54). The natural language data is data inputted through the natural language input section 2. When input of a natural language is started, as shown in FIG. 9B, visual information such as "If a liquid in the glass is wine . . . " is displayed in the natural language display area 202. When the message is displayed, the cursor CUR is displayed at a position where the data is to be inputted or a position where the data is to be corrected. This cursor CUR can be moved using the operating section not shown herein.

As shown in FIG. 9C, when input of visual information "If a liquid in the glass . . . placed on the table" is completed, the end of input is confirmed by selecting the "END" icon 204 (step S55). Accordingly, the processing between step S54 and step S55 is repeated until this "END" icon 204 is selected.

As described above, when input of the visual information is ended (step S55), image data for forming the image a displayed in the image display area 201 is correlated with natural language data for forming visual information displayed in the natural language display area 202, and the correlated data is registered in the image database 5 as one of files as shown in FIG. 10 (step S56). In this registration, a file name such as "Photograph No. 1" can be given to a file using the operating section which is not shown herein. It should be noted that other attribute information can be added thereto, but it has not much to do with the object of the present invention, so that description thereof is omitted.

In case of FIGS. 9A to 9C, although a still picture (e.g. a photograph) such as the image a is taken up as an example, in Embodiment 1, the same processing is executed also to successive images namely to the moving pictures.

Namely, as shown in FIG. 11, in a case where a series of motions in physical exercises are made up to a moving picture, visual information can be given while a user is looking at the changes in the successive frames. For instance, if a user inputs visual information such as "after raising both hands upwards, rotate the shoulders" while looking at an image around the frame 1, and further continuously inputs visual information. such as "next, opening both legs . . . try touching the left ankle by the right hand." while looking at an image around the frame m (m>1, m: a natural number), and furthermore, continuously inputs visual information such as "when touching the left ankle . . . try touching the right ankle by the left hand." while looking at an image around the frame n (n>m, m: a natural number), visual information for the moving picture can subjectively be given.

Figure 12:
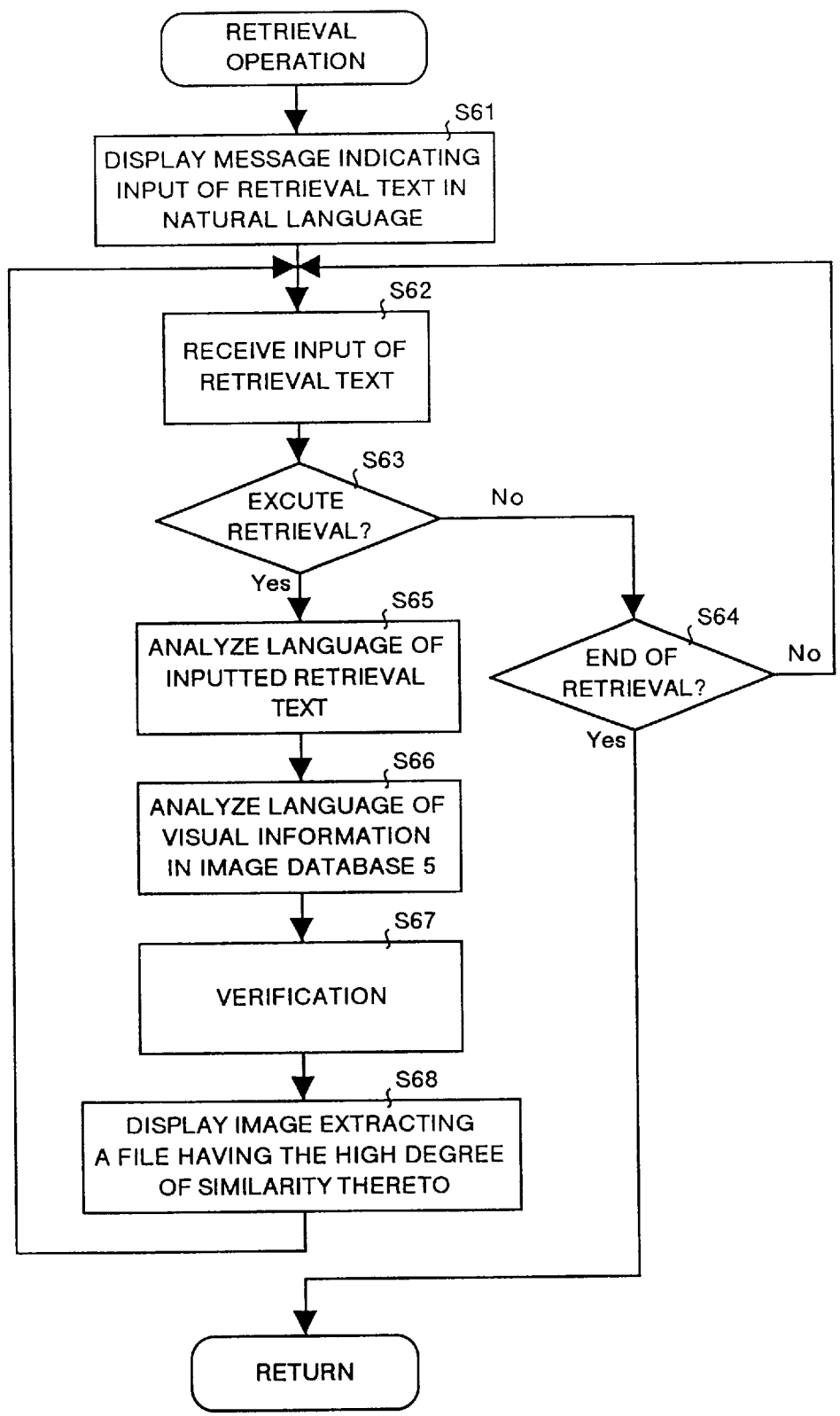
FIG. 12 is a flow chart for explaining retrieving operations in Embodiment 1.

In the next, description is made for retrieval operations of an image. FIG. 12 is a flow chart for explaining retrieval operations in Embodiment 1, and FIGS. 13A to 13C are views showing examples of the display transitions when the retrieval operations in Embodiment 1 are executed. Description herein assumes a case as an example where the image a is retrieved from the image database 5.

When the processing shifts to the retrieval operations, as shown in FIG. 13A, an image display area 301 and a natural language display area 302 are displayed on the screen of the display section 4. Then, displayed, as shown in FIG. 13A, in the natural language display area 302 is a message ("Input a retrieval text" in the example in the figure) 303 indicating a retrieval text for an image as an object for retrieval is to be inputted in a natural language (step S61).

It should be noted that an "END" icon 304 for ending this retrieval operations and "EXECUTE" icon 305 for instructing execution of the retrieval operations are displayed in the natural language display area 302.

Then, input of the retrieval text namely natural language data is received (step S62). The natural language data is a data that is inputted through the natural language input section 2. When input of a natural language is started, as shown in FIG. 13B, the retrieval text such as "Which is an image illustrating that a chilly drink is placed on the table?" is displayed in the natural language display area 302.

In this case also, the cursor CUR is also displayed, although it is not shown herein, so that it indicates the next position where the data is to be inputted or a position where the data is to be corrected, then the cursor CUR is moved using the operating section not shown herein. It should be noted that instruction for execution of retrieval (step S63) through the "EXECUTE" icon 305 or instruction for ending the processing (step S64) through the "END" icon 304 is sensed until the retrieval text is completely inputted.

As shown in FIG. 13B, when input of the retrieval text is completed and the "EXECUTE" icon 305 is selected (indicated by the shaded area in the figure) (step S63), language analysis of the inputted retrieval text based on its natural language data is carried out (step S65) and also language analysis of the visual information in the image database 5 based on its natural language data is carried out in the language analyzing section 7 (step S66).

As described above, by linguistically analyzing both, the inputted retrieval text and the visual information, a verification in which the base is matched can be performed (step S67). This verification follows the principles described above in FIG. 3. To further described in detail, in the verification, it is determined how many shared impressions with the information expressed by the retrieval text are included in the visual information from view point of the context expressed in the natural language. Herein, any existing technology may be used as long as it is a verifying technology based on the degree of similarity therebetween (a degree of agreement therebetween).

When a result of the verification can be obtained as describe above, a file having a high degree of similarity thereto is extracted. In this case, the file with the file name "Photograph No. 1" having the image a is extracted. Accordingly, the image a is displayed, as shown in FIG. 13C, in the image display area 301 based on the image data for the file (step S68).

Since an image having a high degree of the similarity is displayed herein, if there are a plurality of candidates, a preset number of images may be displayed in the ascending order, or a plurality of images are displayed as candidates, and if a desired image is found therein, only the desired image may be displayed. The technology described above is well known, so that description thereof is omitted.

After the processing in step S68, the processing returns to step S62, so that, if other images are to be further retrieved, the "EXECUTE" icon 305 may be operated after the retrieval text is changed (step S62 and step S63). Also, by selecting the "END" icon 304, the retrieval processing can be ended (step S64).

Figure 14:
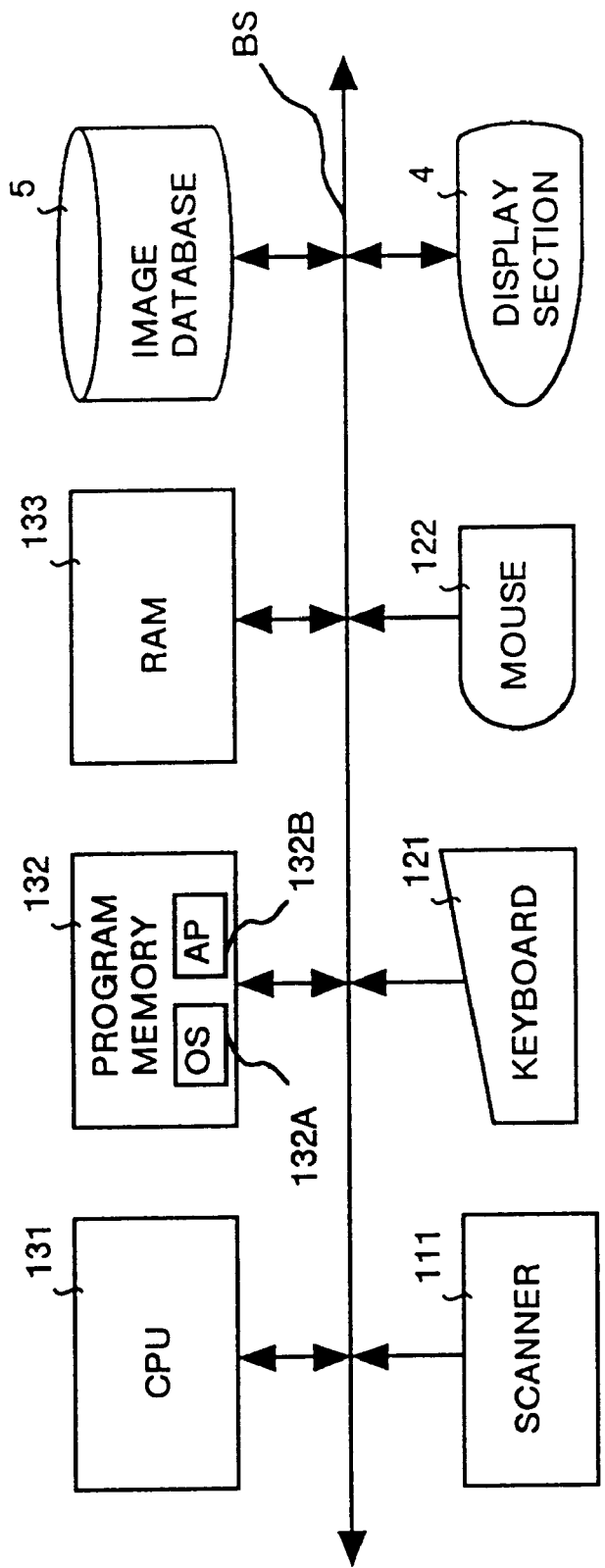
FIG. 14 is a block diagram showing the hardware configuration of the apparatus for processing images according to Embodiment 1 of the present invention.

Herein, a case where the image processing apparatus is realized with hardware is taken up as an example. FIG. 14 is a block diagram showing hardware configuration of the apparatus for processing images according to Embodiment 1 of the present invention.

In the hardware configuration shown in FIG. 14, a scanner 111, a keyboard 121, a mouse 122, a CPU 131, a program memory 132, and a RAM 133 can also be applied in addition to the display section 4 and the image database 5 which are shared with other configuration functionally and as components constituting the hardware configuration. These units are connected to the CPU 131 by a bus BS.

The CPU 131 is a unit operating according to various programs stored in a program memory 132 and executes processing corresponding to those in the image/natural language correlating section 3, the retrieving section 6, and the language analyzing section 7 each in the functional blocks in FIG. 4. The program memory 132 stores therein an operating system OS132A with which the CPU 131 operates as well as an application program 132B. The RAM 133 is used as a work area of the CPU 131.

It should be noted that the dictionary section 8 in the functional blocks shown in FIG. 4 may be stored as a part of the application program 132B, or may be connected to the bus BS as a discrete unit.

The scanner 111 is a unit corresponding to the image input section 1 and outputs the image data obtained by scanning an image to the RAM 133 according to the control by the CPU 131. The keyboard 121 is a unit corresponding to the natural language input section 2 and inputs data such as visual information and a retrieval text or the like by inputting characters or the like. The mouse 122 is a pointing device supporting the input of data through the keyboard 121 or selection of each icon described above.

As described above, with Embodiment 1, image data and natural language data indicating visual impressions on an image formed based on the image data are correlated with each other to be stored in the image database 5, so that it is possible to add an image into a database with some subjective elements in the visual impressions on the image which a user has.

Previously stored in the image database 5 are image data and natural language data indicating visual impressions of an image formed based on the image data by means of correlation therebetween, and in a case where a user accesses the image database 5 with the natural language data indicating the visual impressions stored thereon, the image data relating to the natural language data is given back thereto as a response, so that it is possible to access the image database with user's visual impressions on an image namely the subjective impressions thereon regardless of any attribute information such as a filing data of the image or a type thereof or the like, which allows easy access to a desired image.

In addition, image data covers data for still pictures as well as data for moving pictures, so that it is possible to give arbitrary visual information to each image regardless of types of images.

Previously stored in the image database 5 are image data and natural language data indicating visual impressions of an image formed based on the image data by means of correlation therebetween, and by inputting natural language data indicating a retrieval text to verify it with the natural language data on the image database 5, the image data relating to the natural language data sharing the visual impressions is extracted from the image database 5, so that an image can be retrieved only with some visual impressions namely some subjective impressions thereon without knowing the attribute information for the image, which makes it possible for a user to retrieve a desired image more reliably and more efficiently.

When the image is to be retrieved, the natural language data stored in the image database 5 and the inputted natural language data are linguistically analyzed for verification therebetween, which allows high-precision verification therebetween suitable to the meaning which the visual impressions have.

An image is displayed based according to the image data extracted through the retrieval, so that a result of retrieval is visually displayed, which allows easy recognition as to whether the result of retrieval is correct or incorrect.

Natural language data that is being stored in the database correlated with the image data is inputted through key operations, so that it is possible to give arbitrary visual information to each image without bothering about the objectivity of an image.

Embodiment 2

In Embodiment 1 as described above, verification between natural language data as a retrieval text and natural language data on the image database 5 is carried out after both of the data are linguistically analyzed, however, like Embodiment 2 described below, visual impressions about the natural language data stored on the image database 5 are first inferred and verification therebetween may be executed.

In this case, Embodiment 2 employs the entire configuration (refer to FIG. 4) according to Embodiment 1 for the configuration therein, so that the same reference numerals are assigned to the shared sections herein with both embodiments, and description thereof is omitted herein. Description is made hereinafter for different configuration as well as functions, and description of the same points as those in Embodiment 1 is omitted herein.

Figure 15:
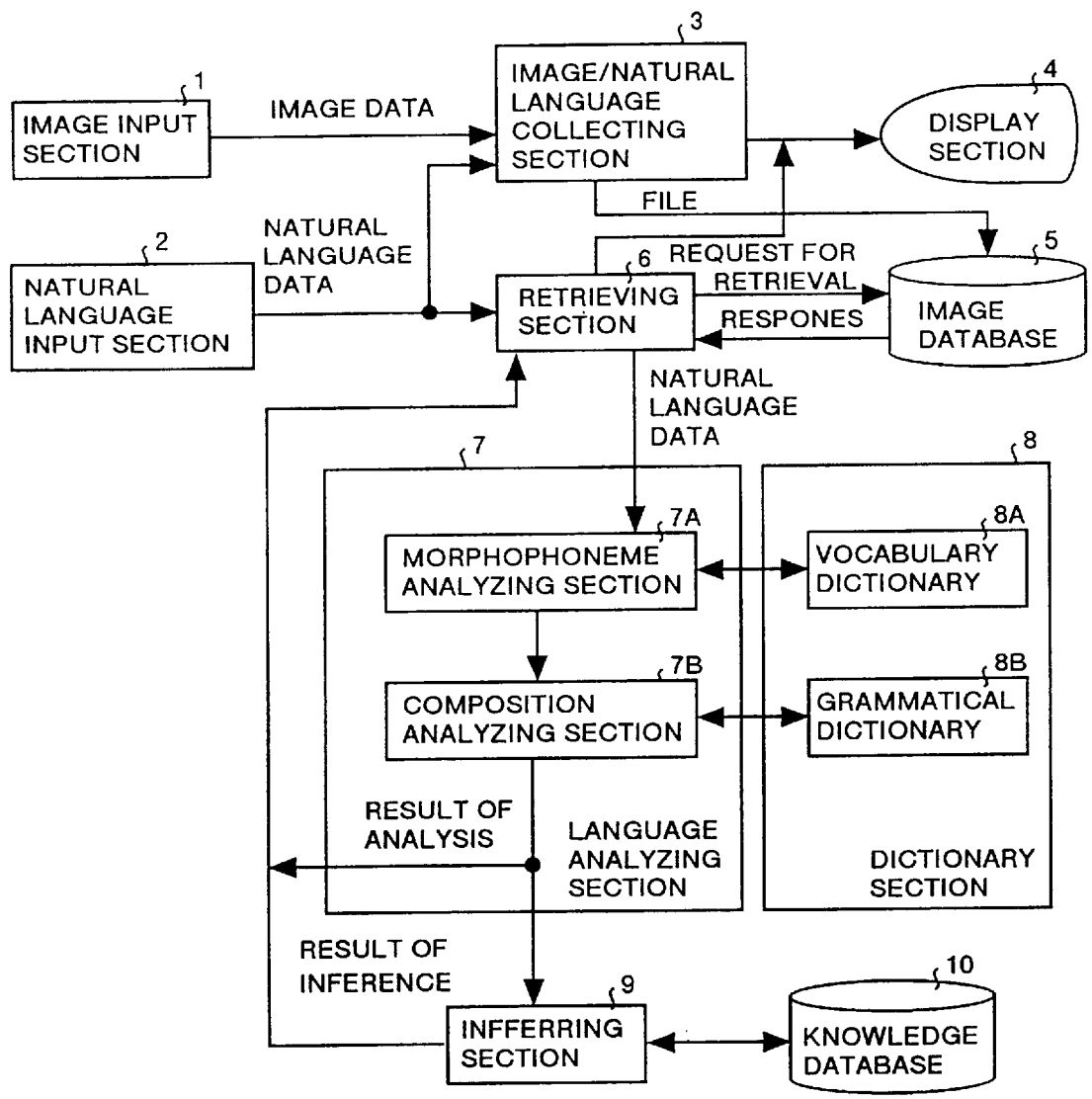
FIG. 15 is a block diagram showing functionally an apparatus for processing images according to Embodiment 2 of the present invention.

At first, description is made for the configuration. FIG. 15 is a block diagram showing functionally an apparatus for processing images according to Embodiment 2 of the present invention. In Embodiment 2, the principles are also the same as those in Embodiment 1. An inferring section 9 and a knowledge database 10 are added newly to the apparatus for processing images in Embodiment 2. Inference is actually executed in the language analyzing section 7, however, from the view point of generating new visual information between a plurality of visual information after linguistic analysis is executed thereto, the inferring section 9 and the knowledge database 10 are made to components of the apparatus.

The inferring section 9 receives a result of analysis by the language analyzing section 7, creates new visual information which can be estimated from a plurality of visual information to the result of analyzing a retrieval text by referring to the knowledge database 10, and outputs the created visual information to the retrieving section 6 as a result of the inference. The. knowledge database 10 receives the result of the analysis from the inferring section 9, connects results of analysis of a plurality of visual information to each other from every point of view, and supports to create new subjective impressions.

It should be noted that, in the hardware configuration, it is assumed that the inferring section 9 corresponds to the CPU 131, and the knowledge database 10 may be stored as a part of an application program AP132B, like the dictionary section 8, or may be stored in a discrete memory.

Figure 16:
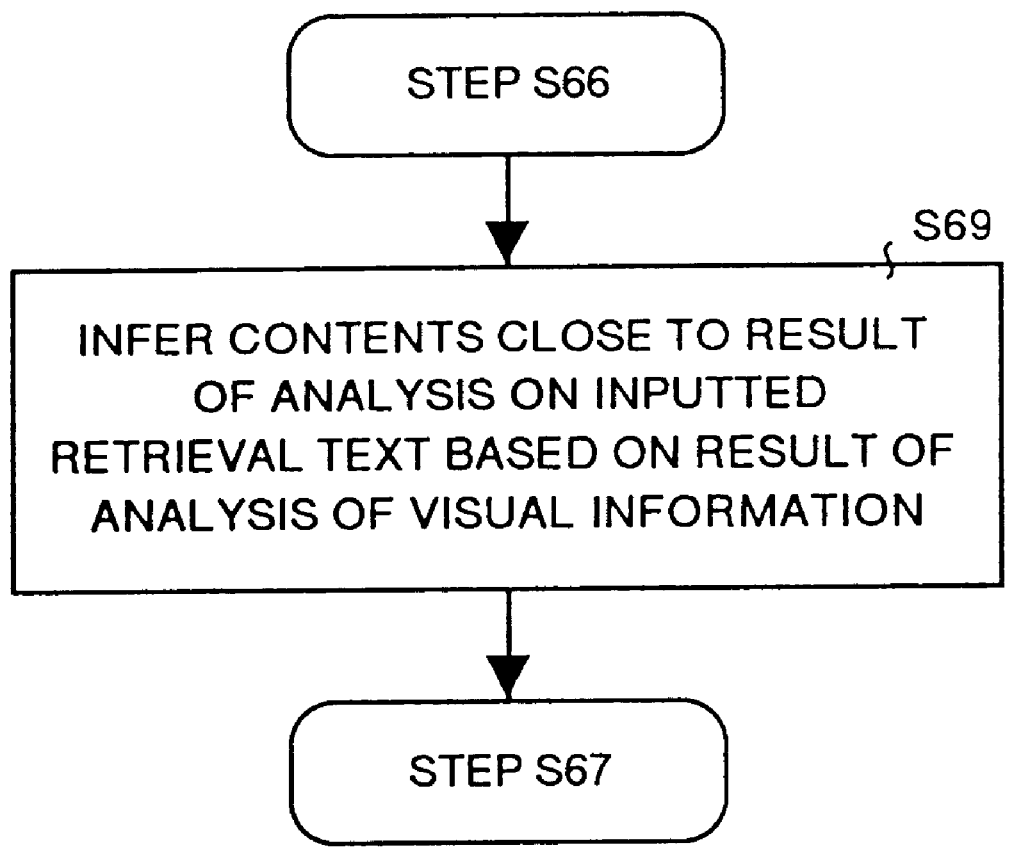
FIG. 16 is a flow chart for explaining the key steps in the retrieving operations in Embodiment 2.
Figure 17:
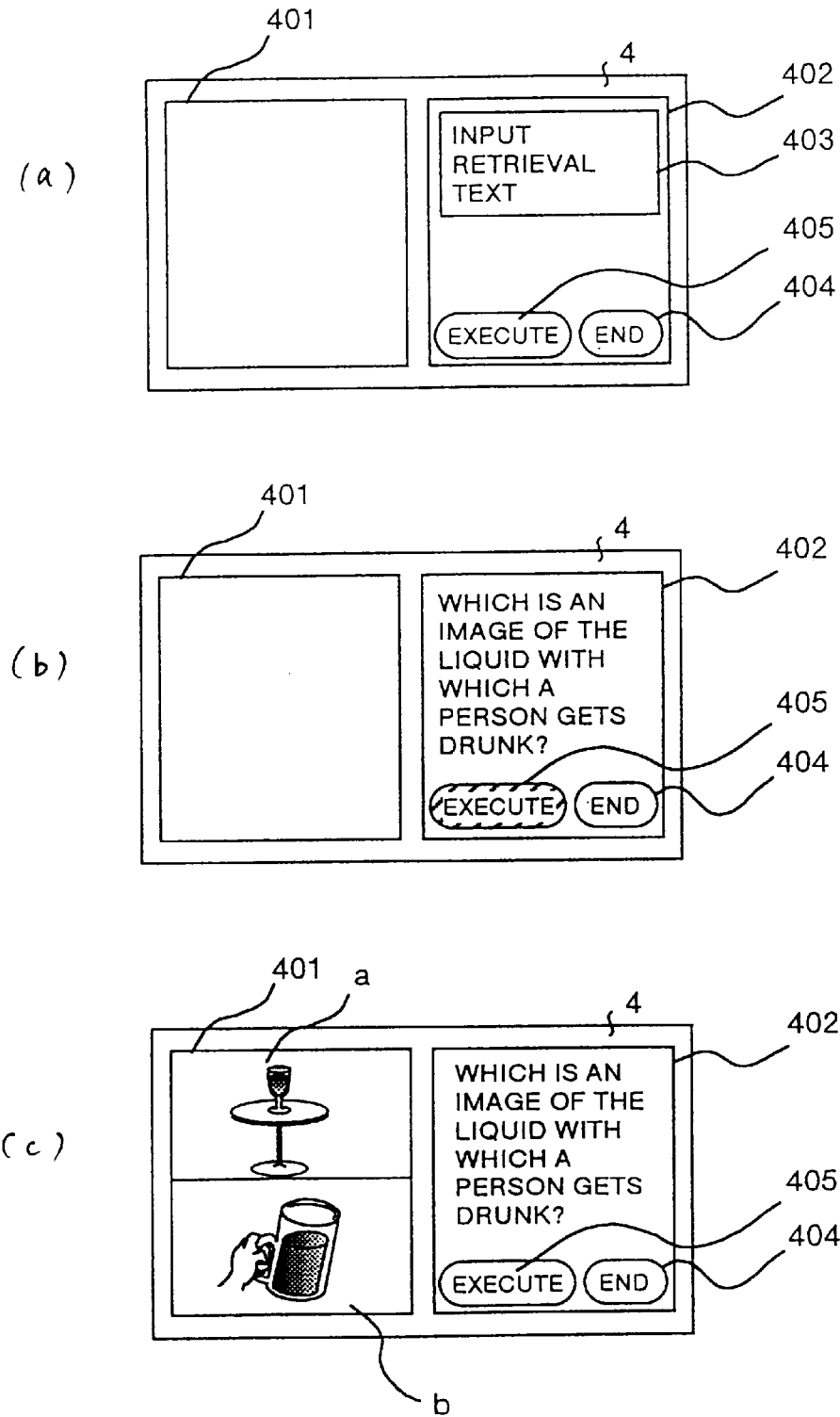
FIGS. 17A to 17C are views showing example of the display transitions when the retrieving operations in Embodiment 2 are executed.

In the next, description is made for retrieval operations that are different from those in Embodiment 1. FIG. 16 is a flow chart for explaining the key steps of retrieval operations in Embodiment 2, and FIGS. 17A to 17C are views showing examples of the display transitions when the retrieval operations in Embodiment 2 are executed. In FIG. 16, only new step is shown and the boxes indicating the steps which are common with FIG. 12 are not shown.

In Embodiment 2, like in Embodiment 1, when the processing shifts to the retrieval processing, an image display area 401 and a natural language display area 402 are displayed on the display section 4 (refer to FIG. 17A). At the same time, a message "Input retrieval text" 403 is displayed in the natural language display area 402, so that, when a retrieval text such as "which is an image of a liquid with which a person gets drunk?" is inputted and the "EXECUTE" icon 405 is selected, the retrieval is executed according to the retrieval text "which is an image of a liquid with which a person gets drunk?" (refer to FIG. 17B).

When the linguistic analysis of the visual information on the image database 5 is ended in step S66 after the linguistic analysis on the retrieval text is ended in step S65, inference processing is executed in this Embodiment 2. Namely, contents close to a result of analysis on the inputted retrieval text is inferred based on the result of analyzing the visual information (step S69). Simple description is made hereinafter for the principles.

Description herein also assumes the images a, b, and c as examples. In case of image a, a result of the analysis that the image is an image of "wine" can be obtained as shown in FIG. 1, in case of image b, a result of the analysis that the image is an image of "beer" can be obtained as shown in FIG. 3, and in case of image c, a result of the analysis that the image is an image of "coffee" can be obtained as shown in FIG. 3.

Then, if such data as "Wine includes alcohol", "Beer includes alcohol", "Coffee does not include alcohol", and "A person gets drunk with a drink including alcohol" are registered in the knowledge database 10, referring to the image a, inference that "wine" is a liquid with which a person gets drunk can be satisfied. Similarly, referring to the image b, inference that "beer" is a liquid with which a person gets drunk can be satisfied. In contrast, referring to the image c, inference that "coffee" is a liquid with which a person does not get drunk can be satisfied.

As a result, visual information having such contents as "it seems an image of wine with which a person gets drunk" is newly generated for the image a, visual information having such contents as "it seems an image of beer with which a person gets drunk" is newly generated for the image b, and visual information having such contents as "it seems an image of coffee with which a person does not get drunk" is newly generated for the image c. Each of the new visual information outputed from the inferring section 9 to the retrieving section 6 for verification executed in step S67 with a result of analysis thereof described in Embodiment 1.

After the above step and on, like Embodiment 1, verification (step S67) between the input retrieval text and the visual information based on a result of analysis thereof and image display (step S68) by extracting a file having a high degree of similarity to the input retrieval text are executed. As a result, as shown in FIG. 17C, the image a and the image b are displayed as objects for retrieval in the image display area 401, but the image c is not displayed because it is inferred that the image c is not the object for this retrieval.

As described above, with Embodiment 2, image data and natural language data indicating a plurality of visual impressions of the image formed based on the image data are correlated with each other to be previously stored in the image database 5, and in a case where a new visual impression corresponding to a visual impression in the natural language data which is the retrieval text can be derived from a plurality of visual impressions in certain natural language data on the image database 5 with the knowledge database 10 being referred to, image data relating to the certain natural language data is extracted from the image database 5, so that, at the time of retrieval, even if natural language data is one that might be overlooked in a case where visual information on the image database 5 is singularly used, the data can be found without fail as an object for extracting an image, which makes it possible to retrieve a desired image more reliably and more efficiently.

Furthermore, the natural language data stored in the image database 5 and the inputted natural language data are linguistically analyzed before inferring, which allows high-precision inference suitable to the meaning which a visual impression has.

Also, when the images are retrieved, a plurality of image data are extracted in the ascending order from an image having a higher degree of the similarity according to a result of verification, so that a plurality of images which match the visual impressions are taken up as candidates, which makes it possible to retrieve a desired image more efficiently even from the visual impressions.

Embodiment 3

In Embodiments 1 and 2 as described above, natural language data is manually inputted through the natural language input section 2, however, like Embodiment 3 described below, natural language data may be automatically inputted by using the technology of image pattern) recognition.

In this case, Embodiment 3 employs the entire configuration (refer to FIG. 4 or FIG. 15) according to Embodiment 1 or Embodiment 2 for entire configuration therein, so that the same reference numerals are assigned to the shared sections herein with both embodiments, and description thereof is omitted. Description is made hereinafter only for configuration as well as functions that are different, and description of the points which are same are omitted.

Figure 18:
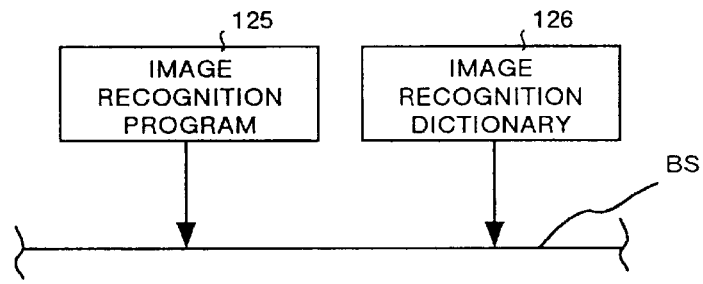
FIG. 18 is a block diagram showing the key sections of hardware configuration of an apparatus for processing images according to Embodiment 3 of the present invention.

At first, description is made for the configuration that is different from that in Embodiment 1 or in Embodiment 2. FIG. 18 is a block diagram showing the key sections of the hardware configuration of an apparatus for processing images according to Embodiment 3 of the present invention. In Embodiment 3, an image recognition program memory 125 storing therein an image recognition program and an image recognition dictionary 126 for supporting image recognition processing are newly connected to the bus BS. The newly added configuration are operated based on the well-known image recognition technology, so that detailed description thereof is omitted herein.

Figure 19:
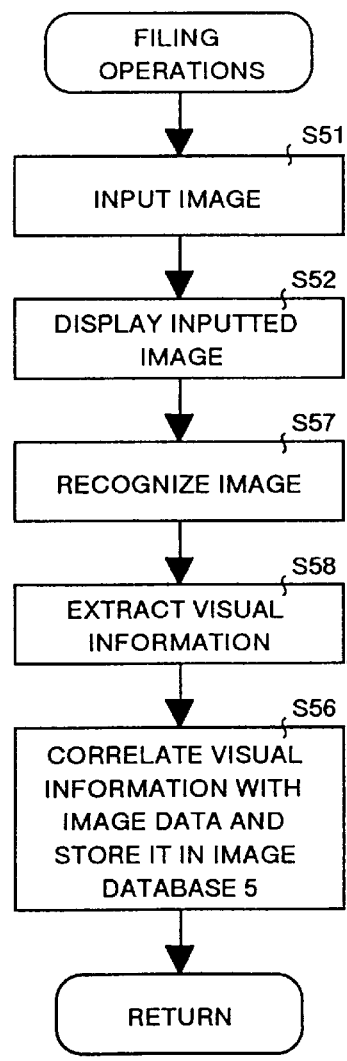
FIG. 19 is a flow chart for explaining filing operations in Embodiment 3 of the present invention.

Next description is made for filing operations which are different from those in Embodiments 1 and 2. FIG. 19 is a flow chart for explaining filing operations according to Embodiment 3. In the same way as in Embodiments 1 and 2, when image input step S51) and display of the inputted image (step S52) are ended, image recognition is executed based on the inputted image data with reference to the image recognition dictionary 126 according to the image recognition program (step S57). In the above operation, a form, a size, color of each component in the image, and a positional relation thereof to other image components or the like are elements used for recognition.

Further, visual information of the image is extracted from a result of recognizing the image (step S58). In this extraction, to obtain a subjective impression, if the image has dark coloring, visual information such as "an image with a dark colors" may be extracted, on the other hand, if the image has bright coloring, visual information such as "an image with a bright colors" may be extracted. When visual information is extracted according to the rules described above, restriction of impressions of the image due to objectivity thereof can be prevented, so that more subjective impressions can be correlated with the image like in a case of key entry or voice entry.

This subjective impression can be applied to, for instance, paintings. In case of paintings, since a person has own brush-touches in painting, the touches are expressed in the painting as they are, so that it is possible to give various expressions such as a powerful image, or a sensitive image or the like to the paintings. For this reason, the subjective impressions are applicable to a system for managing a book of paintings.

In a case where a glance at an image shows that two persons and a mirror exist therein, as visual information, contents such as "there are two persons" or "one person is a real one and the other person is his image reflected in a mirror." may be given. Then, if visual information including "mirror" in the latter is correlated with the image, even if a retrieval condition such as "I believe there was one person" is given, an image that two persons exist therein can also be retrieved according to inference that one person becomes two therein by being reflected in the mirror.

After the above step and on, similarly to Embodiments 1 and 2, the visual information obtained in step S58 and the image data are correlated with each other to be registered into the image database 5 (step S56).

As described above, with Embodiment 3, natural language data to store therein correlated with the image data is inputted through image recognition, so that, if the image recognition dictionary 126 is configured so that visual information for subjectively expressing color of an image, a form and a size of each subject in the image or the like can be obtained, it is possible to give more subjective visual information to each image without bothering about the objectivity thereof.

Embodiment 4

In Embodiments 1 to 3 as described above, filing and retrieval are executed with the apparatus for processing images as a single apparatus, however, like in Embodiment 4 described below, functions may be decentralized by separating the apparatus for processing images into a client and a server.

Figure 20:
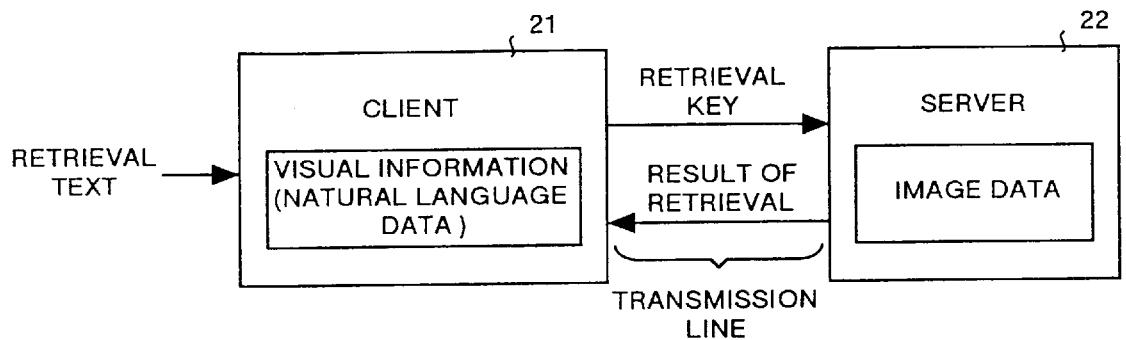
FIG. 20 is a block diagram showing functionally an apparatus for processing images according to Embodiment 4 of the present invention.

Description is made herein only for the configuration. FIG. 20 is a block diagram showing functionally an apparatus for processing images according to Embodiment 4. The apparatus for processing images according to Embodiment 4 is separated, as shown in FIG. 20, into a client 21 and a server 22. In each of the embodiments above, image data and natural language data are correlated with each other to be stored in the image database 5, however, in Embodiment 4, natural language data as visual information is stored in the client 21, and image data correlated with the visual information is stored in the server 22.

The visual information and image data are correlated with each other by adding a keys for retrieval (such as address or identification information) for making access to image data to the visual information. Namely, a retrieval key shared with visual information and image data is added to the apparatus.

Accordingly, when an image is retrieved, at first, input retrieval text and visual information are verified with each other after both of the data are linguistically analyzed like in the above embodiments, then, when processing reaches the step of extracting an image, a retrieval key is taken out from the visual information having a higher degree of similarity, and a desired image can be extracted from the server 22 with the retrieval key. The retrieval key and the image data which is a result of the retrieval are transmitted and received in the client 21 and the server 22 through a transmission line.

It should be noted that, in filing, the client 21 executes as far as correlation therebetween including a retrieval key, leaves the visual information in the apparatus, and transmits the image data to the server 22. The server 22 stores therein the image data received from the client 21.

As described above, with Embodiment 4, in addition to each effect obtained in Embodiments 1 to 3, by decentralizing the functions, the need for storing image data in the side of a client is eliminated, and for this reason, it is possible to suppress an amount of data in the side of a client to the required minimum amount.

Embodiment 5

Description of Embodiment 1 assumes an example of inputting a natural language through the keyboard 121, however, like in Embodiment 5 described below, a natural language may be inputted by voice input. Herein, there is only a difference in configuration of inputting a natural language, so that description is made hereinafter only for this point.

Figure 21:
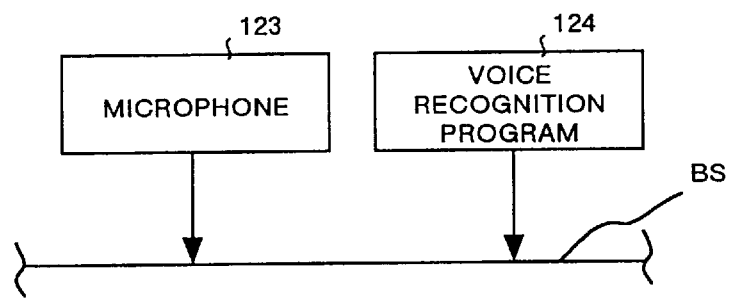
FIG. 21 is a block diagram showing the key sections of hardware configuration of an apparatus for processing images according to Embodiment 5 of the present invention.

FIG. 21 is a block diagram showing the key sections of the hardware configuration of an apparatus for processing images according to Embodiment 5 of the present invention. In Embodiment 21, a microphone 123 for inputting voices and a voice recognition program memory 124 storing therein a voice recognition program for executing voice recognition based on the voice data inputted from the microphone 123 are connected to the bus BS.

The microphone 123 and voice recognition program memory 124 constitute the natural language input section 2, so that they are added to the configuration in each of the embodiments described above as other natural language input section. Natural language can be inputted using a voice through the microphone 123 as well as the voice recognition program memory 124.

As described above, with Embodiment 5, natural language data that is being stored in the database correlated with the image data is inputted through voice recognition, so that it is possible to give arbitrary visual information to each image, like in Embodiment 1, without bothering about the objectivity thereof.

Embodiment 6

Description of Embodiment 1 assumes an example of inputting an image through the scanner 111, however, like in Embodiment 6 described below, an image may be inputted through communications. Herein, there is only a difference in the configuration for inputting image data, so that description is made hereinafter only for this point.

Figure 22:
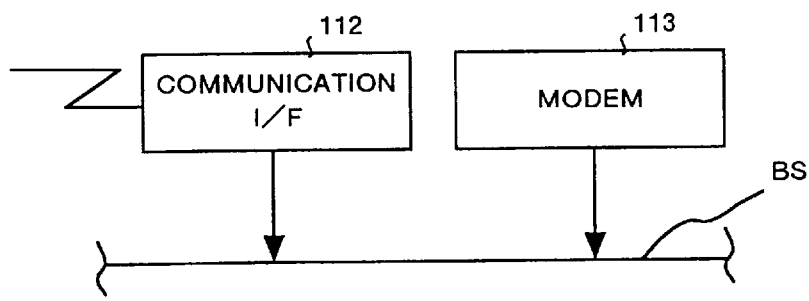
FIG. 22 is a block diagram showing the key sections of hardware configuration of an apparatus for processing images according to Embodiment 6 of the present invention.

FIG. 22 is a block diagram showing the key sections of the hardware configuration of an apparatus for processing images according to Embodiment 6 of the present invention. In Embodiment 22, a communication I/F 112 connected to a communication line and a modem 113 for modulating/demodulating data to be transmitted or received through the communication I/F 112 are connected to the bus BS.

The communication I/F 112 and modem 113 constitute the image input section 1, so that they are added to the configuration in each of the embodiments described above as other image input section. Image data can be inputted from outside the apparatus using the -communication I/F 112 as well as the modem 113.

As described above, with Embodiment 6, the same effects as those in Embodiments 1 to 5 can be obtained even in the purpose of fetching an image through a communication line, so that, if visual information is given to a home page at the time of using the Internet having been widely available in recent years, it is possible to easily manage enormous amount of home pages only with visual impressions.

With the invention as described above, image data and natural language data indicating a visual impression of an image prepared based on the image data are correlated and stored in the correlated form, and for this reason there is provided the advantage that it is possible to obtain an apparatus for managing images in which images are stored in database with subjective elements of visual impressions.

With the invention as described above, image data and natural language data indicating a visual impression of an image prepared based on the image data are correlated to each other and stored in the correlated form, and in a case where access is executed with natural language data for a visual impression on image database, image data relating to the natural language data is returned as a response, so that images can be accessed with a visual impression, namely a subjective impression irrespective of attribute information, and for this reason there is provided the advantage that it is possible to obtain an apparatus for managing images in which a desired image can easily be accessed.

With the invention as described above, natural language data to be stored in correlation to image data is inputted through key operations, voice recognition, image recognition or the like, and for this reason there is provided the advantage that it is possible to obtain an apparatus for managing images which can give visual information with subjectivity to each image without being restricted by the need for objectivity.

With the invention as described above, image data is a data such as still picture data or moving picture data, and for this reason there is provided the advantage that it is possible to obtain an apparatus for managing images which can give arbitrary visual information to each image without being restricted by the type of the image.

With the invention as described above, image data and natural language data indicating a visual impression of an image prepared based on the image data are correlated to each other and stored in the correlated form in the image database, and by inputting natural language data indicating a text for retrieval and collating the data to the natural language data on the image database, image data relating to natural language data having a common visual impression is extracted from the image database, so that an image can be retrieved according only to a visual impression, namely a subjective impression, without the need for knowing attribute information of the image whereby there is provided the advantage that it is possible to obtain an apparatus for retrieving images which can retrieve a desired image more accurately and more efficiently.

With the invention as described above, in the step of retrieval, natural language data stored in image database and inputted natural language data are collated to each other after linguistic analysis thereof, and for this reason there is provided the advantage that it is possible to obtain an apparatus for retrieving images which can make collation with high-precision suited to the meaning of a visual impression.

With the present invention as described above, in the step of retrieval, a plurality of image data are extracted in an ascending order from data having a higher similarity according to a result of collation, so that a plurality of images having similar visual impressions are provided as candidates; whereby there is provided the advantage that it is possible to obtain an apparatus for retrieving images which can retrieve a desired image even from a visual impression more efficiently.

With the invention as described above, image data and natural language data indicating a visual impression of an image prepared based on the image data are correlated to each other and stored in the correlated form in image database, and in a case where a new visual impression corresponding to a visual impression of natural language data as a text for retrieval can be obtained from a plurality of visual impressions for the natural language data on the image database, image data relating to the natural language data is extracted from the image database, so that, in the step of retrieval, even natural language data which may be overlooked in a case where visual information on the image database is used independently can accurately be secured as an object for image extraction; whereby there is provided the advantage that it is possible to obtain an apparatus for retrieving images which can retrieve a desired image more accurately and more efficiently.

With the invention as described above, in the step of inferring, inferring is executed after linguistic analysis of the natural language data stored on the image database and inputted natural language data, and for this reason there is provided the advantage that it is possible to obtain an apparatus for retrieving images which can execute high-precision inference suited to the meaning of a visual impression.

With the invention as described above, image display is executed based on image data extracted through retrieval, so that a result of retrieval is visually provided; whereby there it provided the advantage that it is possible to obtain an apparatus for retrieving images in which it is easy to check whether the result of retrieval is correct or erroneous.

With the invention as described above, image data and natural language data indicating a visual impression for an image prepared based on the image data are correlated to each other and then the image data and natural language data are stored, and for this reason there is provided the advantages that it is possible to obtain a method for managing images in which images can be stored in database with subjective elements of visual impressions of the images.

With the invention as described above, natural language data indicating a text for retrieval is inputted, inputted natural language data is collated to natural language data stored in image database in which image data and natural language data indicating a visual impression for the image prepared based o the image data are stored in a correlated form, and image data relating to natural image data having a common visual impression is extracted from the image database according to a result of collation, so that a desired image can be retrieved according only to a visual impression, namely an objective impression without the need for knowing attribute information of the image; whereby there is provided the advantage that it is possible to obtain a method for retrieving images in which a desired image can be retrieved more accurately and more efficiently.

With the invention as described above, a program for making a computer execute the method described above is recorded, so that the program can be read by a computer; whereby there is provided the advantage that it is possible to obtain a recording medium with which the operations described above can be realized by a computer.

This application is based on Japanese patent application No. HEI 9-111504 filed in the Japanese Patent Office on Apr. 28, 1997, the entire contents of which are hereby incorporated by reference.

Although the invention has been described with respect to specific embodiments for a complete and clear disclosure, the appended claims are not to be thus limited but are to be construed as embodying all modifications and alternative constructions that may occur to one skilled in the art which fairly fall within the basic teaching herein set forth.

What is claimed is:

1. An apparatus for retrieving images comprising:
   an image database in which image data and natural language data indicating a visual impression of an image prepared based on the image data are stored in a correlated form;
   a natural language input section for inputting natural language data indicating a text for retrieval; and
   a retrieving section for collating natural language data inputted from said natural language input section to natural language data stored in said image database and extracting image data relating to natural language data having a common visual impression from said image database according to a result of collation;
   wherein said retrieving section extracts a plurality of image data in an ascending order from image data having higher similarity according to a result of collation.

2. An apparatus for managing images according to claim 1 comprising an input section for inputting natural language data by means of key operations, voice recognition or image recognition, and the natural language data inputted by said input section is correlated to the image data and is stored in a correlated form.

3. An apparatus for managing images according to claim 2; wherein said image data is a data such as a still picture data or a moving picture data.

4. An apparatus for managing images according to claim 1 comprising an input section for inputting natural language data by means of key operations, voice recognition or image recognition, and the natural language data inputted by said input section is correlated to the image data and is stored in a correlated form.

5. An apparatus for managing images according to claim 4; wherein said image data is a data such as a still picture data or a moving picture data.

6. An apparatus for retrieving images according to claim 1; wherein said retrieving section collates natural language data inputted using said natural language input section to natural language data stored in said image database after linguistic analysis thereof.

7. An apparatus for retrieving images according to claim 6; wherein said retrieving section extracts a plurality of image data in an ascending order from image data having higher similarity according to a result of collation.

8. An apparatus for retrieving images according to claim 6 comprising a display for displaying the images based on the image data extracted by said retrieving section.

9. An apparatus for retrieving images according to claim 1 comprising a display for displaying the images based on the image data extracted by said retrieving section.

10. An apparatus for retrieving images comprising:

a knowledge database for assisting inference for obtaining a new visual impression from a plurality of visual impressions;

an image database in which image data and natural language data indicating a plurality of visual impressions of an image prepared based on the image data are correlated to each other and stored in the correlated form;

a natural language input section for inputting natural language data indicating a text for retrieval;

an inferring section for obtaining a new visual impression corresponding to a visual impression of natural language data inputted using said natural language input section from a plurality of visual impressions by referring to said knowledge database for each natural language data stored in said image database; and a retrieving section for extracting image data relating to the natural language data from said image database when there exists natural language data of which a new visual impression can be obtained with said inferring section among natural language data stored in said image database.

11. An apparatus for retrieving images according to claim 10; wherein said inferring section executes inference after linguistic analysis of natural language data stored in said image database as well as of inputted natural language data inputted from said natural language input section.

12. An apparatus for retrieving images according to claim 11 comprising a display for displaying the images based on the image data extracted by said retrieving section.

13. An apparatus for retrieving images according to claim 10 comprising a display for displaying the images based on the image data extracted by said retrieving section.

14. A method for retrieving images comprising:

an inputting step of inputting natural language data indicating a text for retrieval;

a collating step of collating the natural language data inputted in said inputting step to the natural language data stored in image database in which image data and natural language data indicating a visual impression of an image prepared based on the image data are correlated to each other and stored in the correlated form;

an inferring step for obtaining a new visual impression corresponding to a visual impression of natural language data inputted in said inputting step; and an extracting step of extracting image data relating to said inputted natural language data having a common visual impression from said image database according to a result of collation in said collating step or for which a new visual impression can be obtained by said inferring step.

15. A computer-readable recording medium with a program for making a computer execute the program described in claim 13 or claim 14 recorded therein.

* * * * *

UNITED STATES PATENT AND TRADEMARK OFFICE
CERTIFICATE OF CORRECTION

| | |
|---|---|
| PATENT NO. | : 6,161,108 |
| APPLICATION NO. | : 09/005148 |
| DATED | : December 12, 2000 |
| INVENTOR(S) | : Kazunori Ukigawa et al. |

It is certified that error appears in the above-identified patent and that said Letters Patent is hereby corrected as shown below:

On the title page, item (30), under "Foreign Application Priority Data", in column 1, line 1, delete "Aug. 28, 1997" and insert -- April 28, 1997 --, therefor.

Signed and Sealed this

Twenty-third Day of June, 2009

JOHN DOLL
*Acting Director of the United States Patent and Trademark Office*